(12) United States Patent
Yokoyama et al.

(10) Patent No.: US 9,694,507 B2
(45) Date of Patent: Jul. 4, 2017

(54) SHAPE DATA GENERATION APPARATUS AND SHAPE DATA GENERATION PROGRAM

(71) Applicant: Graphtec Corporation, a corporation duly organized and existing under the laws of Japan, Kanagawa (JP)

(72) Inventors: Mitsuru Yokoyama, Kanagawa (JP); Hirohito Hori, Kanagawa (JP)

(73) Assignee: Graphtec Corporation, Kanagawa (JP)

( * ) Notice: Subject to any disclaimer, the term of this patent is extended or adjusted under 35 U.S.C. 154(b) by 125 days.

(21) Appl. No.: 14/539,601

(22) Filed: Nov. 12, 2014

(65) Prior Publication Data

US 2016/0098846 A1 Apr. 7, 2016

(30) Foreign Application Priority Data

Oct. 2, 2014 (JP) .................. 2014-203598

(51) Int. Cl.
*B26F 1/38* (2006.01)
*B26D 5/00* (2006.01)
*G06Q 10/04* (2012.01)

(52) U.S. Cl.
CPC ............ *B26F 1/3813* (2013.01); *B26D 5/005* (2013.01); *G06Q 10/043* (2013.01)

(58) Field of Classification Search
CPC .......................................... G05B 2219/35162
See application file for complete search history.

(56) References Cited

U.S. PATENT DOCUMENTS

| 7,278,117 | B2 * | 10/2007 | Gargi | G06F 17/30905 |
| | | | | 345/667 |
| 2007/0034061 | A1 * | 2/2007 | Workman | B26D 5/00 |
| | | | | 83/27 |
| 2007/0240548 | A1 * | 10/2007 | Pape | B26D 5/00 |
| | | | | 83/76.1 |
| 2013/0155069 | A1 * | 6/2013 | Borders | G06T 11/20 |
| | | | | 345/441 |

FOREIGN PATENT DOCUMENTS

| JP | 2001109510 | 4/2001 |
| JP | 2005212077 | 8/2005 |

* cited by examiner

*Primary Examiner* — Kee M Tung
*Assistant Examiner* — Grace Q Li
(74) *Attorney, Agent, or Firm* — Meyertons, Hood, Kivlin, Kowert & Goetzel, P.C.

(57) ABSTRACT

There are provided a shape data generation apparatus and shape data generation program capable of arranging, on one sheet-like medium, parts obtained by slicing one cutting shape. A shape data generation apparatus includes a slicing unit (11) configured to slice a cutting shape represented by supplied shape data into a plurality of parts in accordance with a closed shape prepared in advance, an arrangement unit (12) configured to arrange, of the cutting shape, a part protruding from the closed shape to fit in a free space within the closed shape, and a generation unit (13) configured to generate shape data representing a plurality of parts fitted in the closed shape.

8 Claims, 7 Drawing Sheets

SHAPE DATA GENERATION APPARATUS AND SHAPE DATA GENERATION PROGRAM

BACKGROUND OF THE INVENTION

The present invention relates to a shape data generation apparatus and shape data generation program and, more particularly, to a shape data generation apparatus and shape data generation program for generating shape data for a cutting plotter which cuts a sheet-like medium into a predetermined shape or figure.

There has conventionally been known a cutting plotter including a mechanism that moves a head holding a cutter in two-dimensional directions relatively to a sheet-like medium. The cutting plotter can cut a sheet-like medium into a desired shape, which is also referred to as a "cutting shape" hereinafter, by moving the head based on externally supplied shape data (see Japanese Patent Laid-Open No. 2005-212077). Recently, it is becoming more popular to operate the cutting plotter based on shape data prepared using a graphics drawing application tool, and cut sheet-like media made of various materials into desired shapes, thereby manufacturing a character or grain to be pasted on a signboard or sign, for example.

When cutting a sheet-like medium into desired shapes in order to manufacture a plurality of parts, there is a nesting process technique of automatically arranging the plurality of parts on one sheet-like medium based on shape data of each of the part prepared in advance (see Japanese Patent Laid-Open No. 2001-109510). According to the nesting process technique, a plurality of parts can be cut out of one sheet-like medium by preparing shape data representing the shapes of the plurality of parts.

A sheet-like medium to be cut has a finite size. When a cutting shape is larger than one sheet-like medium, it is necessary to split, or "slice", the cutting shape into a plurality of parts, and cut one sheet-like medium for each of the parts. For example, to manufacture a character or grain for a large signboard by cutting a plurality of sheet-like media by a relatively small cutting plotter, the character or grain for a large signboard, that is, the cutting shape needs to be sliced into a plurality of parts in accordance with the shape and size of a sheet-like medium which can be cut by the cutting plotter. At this time, the sheet-like medium can be effectively used if a plurality of parts can be fitted (nested) in one sheet-like medium.

However, considering that one cutting shape is sliced into a plurality of parts in accordance with the shape and size of one sheet-like medium, for example, the cutting shape can be sliced in several ways, and the features and sizes of the parts are not uniquely determined in many cases.

The above-described conventional nesting process technique is premised on that shape data of respective parts are prepared in advance. Thus, this technique cannot be applied when a plurality of parts obtained by slicing one cutting shape are arranged on one sheet-like medium. As a result, the free space of the sheet-like medium cannot be effectively used, raising the manufacturing cost of the parts. Particularly when an expensive sheet-like medium is cut, the rise of the manufacturing cost of parts is serious.

SUMMARY OF THE INVENTION

The present invention has as its object to provide a shape data generation apparatus and shape data generation program capable of arranging, on one sheet-like medium, parts obtained by slicing one cutting shape.

To achieve the above object, according to the present invention, there is provided a shape data generation apparatus comprising a slicing unit configured to slice a cutting shape represented by supplied shape data into a plurality of parts in accordance with a closed shape prepared in advance, an arrangement unit configured to arrange, of the cutting shape, a part protruding from the closed shape to fit in a free space within the closed shape, and a generation unit configured to generate shape data representing a plurality of parts fitted in the closed shape.

According to the present invention, when a cutting shape represented by supplied shape data cannot be fitted in a closed shape corresponding to the shape and size of one sheet-like medium, for example, parts obtained by slicing the cutting shape in accordance with the closed shape are automatically arranged within the closed shape, generating new shape data including the shapes of the plurality of parts. Parts obtained by slicing one cutting shape can be arranged on one sheet-like medium.

DESCRIPTION OF THE PREFERRED EMBODIMENTS

A shape data generation apparatus according to an embodiment of the present invention will now be described with reference to the accompanying drawings.

1. Arrangement of Shape Data Generation Apparatus

Figure 1:
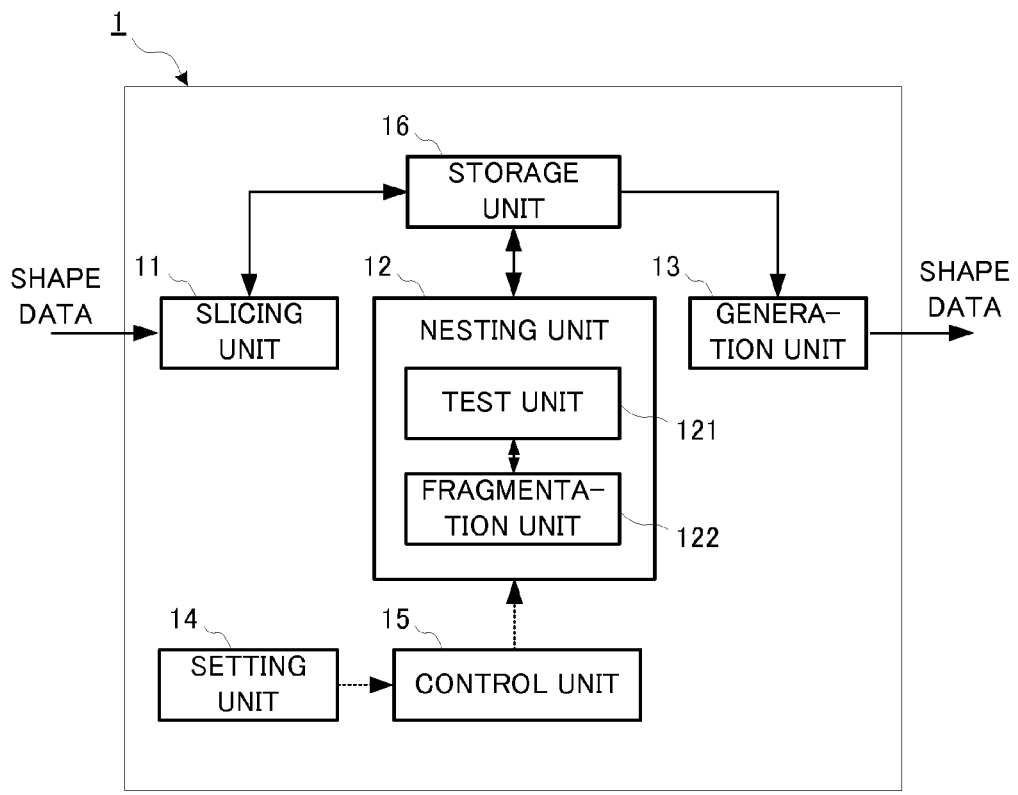
FIG. 1 is a functional block diagram showing the arrangement of a shape data generation apparatus according to an embodiment of the present invention.

As shown in FIG. 1, a shape data generation apparatus 1 according to the embodiment of the present invention includes a slicing unit 11 which slices a cutting shape into a plurality of parts in accordance with a closed shape prepared in advance, a nesting unit 12 which arranges, of the cutting shape, a part protruding from the closed shape prepared in advance to fit in a free space within the closed shape, and a generation unit 13 which generates shape data representing the plurality of parts fitted in the closed shape.

In this specification, arranging a given part to fit in a free space within a closed shape will be referred to as "nest" or "nesting".

The shape data generation apparatus 1 according to the embodiment further includes a setting unit 14 which sets various parameter values and the like for controlling the operation of the shape data generation apparatus 1, a control unit 15 which controls the process of the nesting unit 12 while referring to the set parameter values, and a storage unit 16 which stores shape data representing a cutting shape, data regarding the shapes and sizes of parts obtained by slicing a cutting shape, and information such as the state (position and angle) of a part nested in a closed shape.

Figure 2:
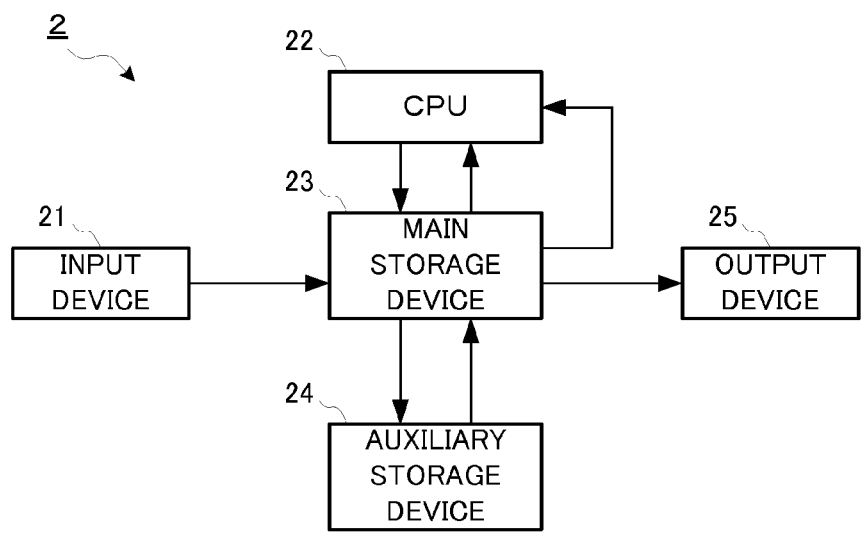
FIG. 2 is a block diagram showing an example of the hardware arrangement of the shape data generation apparatus according to the embodiment.

The shape data generation apparatus 1 is implemented by cooperation between a computer 2 having a hardware arrangement of an input device 21, CPU (Central Processing Unit) 22, main storage device 23, auxiliary storage device 24, and output device 25, as shown in FIG. 2, and a shape data generation program installed in the computer 2. The input device 21 includes, e.g., a keyboard and mouse. The output device 25 can include a cutting plotter which cuts a sheet-like medium based on shape data in addition to a display device such as a display.

(1) Slicing Unit

The slicing unit 11 is a functional unit which slices a cutting shape represented by externally supplied shape data into a plurality of parts in accordance with a closed shape prepared in advance.

A "cutting shape" is a desired shape representing a character or grain to be pasted on a signboard or sign, for example. Shape data to be supplied to the slicing unit 11 is shape data separately created using a graphics drawing application tool or the like. Such shape data may be one described in a "vector format" in which a shape is expressed by numerical data representing the coordinates of points, lines (vectors) connecting a plurality of points, and the like, or one described in a "raster format" in which a shape is expressed as a set of pixels.

As a "closed shape" prepared in advance, an arbitrary closed shape such as a circle or rectangle can be used as long as the closed shape has a predetermined shape and size. For example, when cutting a sheet-like medium using a cutting plotter, a "closed shape" can be defined by the shape, such as rectangle, and size of the sheet-like medium itself to be cut, or the shape and size of an area in which a shape or figure, such as a character or grain, can be actually cut out of the sheet-like medium by the cutting plotter to be used.

The storage unit 16 suffices to store in advance a "closed shape" defined in this manner. It is also possible to register a plurality of types of closed shapes having different shapes and sizes in the storage unit 16 in advance, and select one of these closed shapes by the user of the shape data generation apparatus 1.

In this specification, such a closed shape will also be referred as a "tile", and superposing the closed shape (tile) on a cutting shape in order to slice the cutting shape into a plurality of parts will also be referred as "tiling".

As a function which supports tiling, the slicing unit 11 of the shape data generation apparatus 1 according to the embodiment has a function of superposing and displaying a cutting shape represented by externally supplied shape data, and a tile prepared in advance on the output device 25 such as a display. The user of the shape data generation apparatus 1 can move and rotate one of a cutting shape and tile with respect to the other by operating the input device 21 such as a mouse, and determine the slicing state of the cutting shape by the tile while observing the superposition of the cutting shape and tile displayed on the display.

Figure 6A:
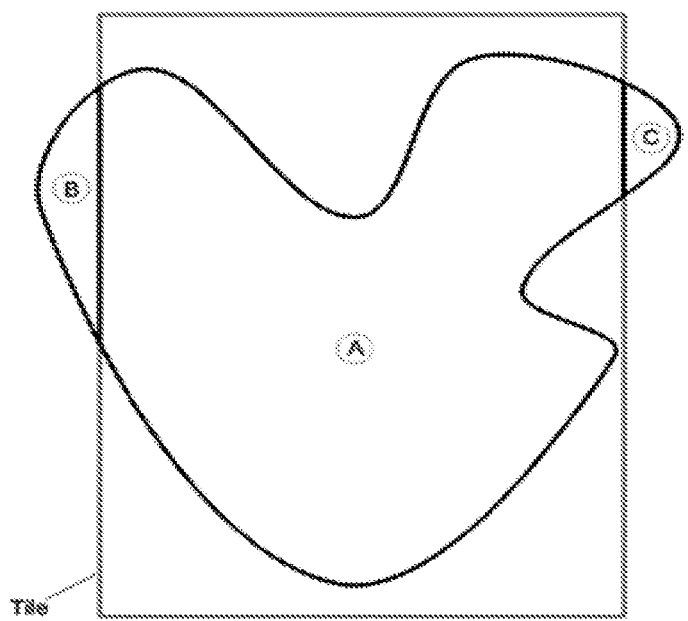
FIG. 6A is a view for explaining the first example of a shape data process by the shape data generation apparatus according to the embodiment.

If the cutting shape can be fitted inside the tile as a result of superposing the cutting shape and tile, shape data of the cutting shape can be adopted as shape data for the cutting plotter without slicing the cutting shape into a plurality of parts. To the contrary, if the cutting shape protrudes from the tile, the cutting shape is sliced into a part inside the tile and a part outside the tile. These portions serve as parts of the cutting shape, respectively. For example, FIG. 6A shows a state in which one cutting shape is sliced by a rectangular tile into a part A inside the tile, and parts B and C outside the tile. The storage unit 16 stores the shapes and sizes (areas) of respective parts obtained by slicing a cutting shape. As for a part positioned inside a tile (e.g., the part A in FIG. 6A), its position inside the tile is also stored in order to identify a free space within the tile.

In this specification, slicing a cutting shape into a plurality of parts in accordance with a tile will also be referred to as "slice" or "slicing".

(2) Nesting Unit

The nesting unit 12 is a functional unit which arranges, of parts obtained by slicing a cutting shape, a part protruding from a tile to fit in the free space of the tile.

In the shape data generation apparatus 1 according to the embodiment, the nesting unit 12 includes a test unit 121 which determines whether a part protruding from a tile can be arranged (can be nested) in a free space within the tile, and a fragmentation unit 122 which, if the part cannot be nested, fragments the part.

(2-1) Test Unit

A test process by the test unit 121 is as follows.

First, a part read out from the storage unit 16 is binarized and scanned in a predetermined direction (from left to right in the embodiment) to perform run length encoding (RLE). Run length encoding is an encoding method which represents the value and number of running pixels of the same value when a part is scanned in a predetermined direction. Similarly, run length encoding is also performed for a free space within the tile. Then, whether the part can be arranged in the free space of the tile is determined by comparing run length-encoded data of the part and run length-encoded data of the free space while moving within the tile in a predetermined direction, e.g., from left to right and from top to bottom by using an upper left portion as a starting point. This is a process of searching for a free space where the part can be arranged, while translating the part within the tile.

The operation of searching for a free space that is capable of accommodating, or "nesting", a part while translating the part within a tile will be also referred to as "scan" or "scanning". RLE vastly improves the speed of the scanning process compared to pixel-by-pixel scanning.

To find out an optimal nesting state, the test unit 121 rotates a part by a predetermined angle of rotation, and then repeats search for a free space by scanning.

Generally when the unit angle of rotation at which a part is rotated by one rotating operation is smaller, more effective nesting can be performed though the calculation time becomes longer because the scanning operation is repeated at various angles of rotation.

In the shape data generation apparatus 1 according to the embodiment, the user can set, via the setting unit 14, the unit angle of rotation at which a part is rotated by one rotating operation in the test process.

Note that the unit angle of rotation when rotating a part may be represented by the angle (°) of rotation at which a part is rotated by one rotating operation, or by the number (N: N is a natural number) of rotating operations for rotating a part by one round of 360°. The relationship between the number N of rotating operations and an available angle of rotation is exemplified below.

| Number (N) of Rotating Operations | Available Angle (°) of Rotation |
|---|---|
| 1 | 0 |
| 2 | 0, 180 |
| 4 | 0, 90, 180, 270 |
| 8 | 0, 45, 90, 135, 180, 225, 270, 315 |
| ... | ... |

When there are a plurality of parts, these parts are arranged (sorted) in an order complying with their areas. The control unit 15 performs the test process by the test unit 121 for the parts in descending order of the area.

If it is determined as a result of the test process by the test unit 121 that a given part can be arranged (nested) in a free space within the tile, the test unit 121 stores, in the storage unit 16, the position of the part within the tile and the angle of rotation.

(2-2) Fragmentation Unit

The fragmentation unit 122 is a functional unit which further slices a part to fragment the part into a plurality of fragments. If it is determined as a result of the test process by the test unit 121 that a part cannot be nested at any of the available angles of rotation, the fragmentation unit 122 fragments the part.

In the embodiment, as a result of fragmentation, a part is sliced into two new parts having almost the same area.

The test unit 121 executes the test process for each of the fragments, or new parts, provided by the fragmentation unit 122.

In general, as fragmentation of a part decreases the size of the part, the fragmented part can be nested at higher possibility. However, when there are a plurality of parts and fragmentation is repeated for one part, the number of executions of a nesting algorithm by the test unit 121 greatly increases, and the calculation efficiency drops. In addition, although recursively fragmenting a part to very small particles often provides a higher level of economy of media usage, it becomes time consuming and complicated for the user to reconstitute very high numbers of small fragments after they have been cut. Thus it is beneficial to add a further threshold to achieve an effective balance between these two priorities.

Hence, in the shape data generation apparatus 1 according to the embodiment, a threshold regarding the area of a part Ath is preset. Only when the area of a part is larger than the threshold Ath, the fragmentation unit 122 fragments the part, thereby preventing excessive fragmentation of one part. The user can set the threshold Ath via the setting unit 14.

(3) Generation Unit

The generation unit 13 is a functional unit which generates shape data representing a plurality of parts fitted in a tile by the nesting unit 12. Shape data generated by the generation unit 13 is supplied to, e.g., the cutting plotter, and can be used as control data when cutting a sheet-like medium. The raster data is used to calculate transforms that move and rotate the vector parts to their nested positions. These transformed parts are generated by unit 13.

2. Operation of Shape Data Generation Apparatus

Next, the operation of the shape data generation apparatus according to the embodiment will be explained.

Figure 3:
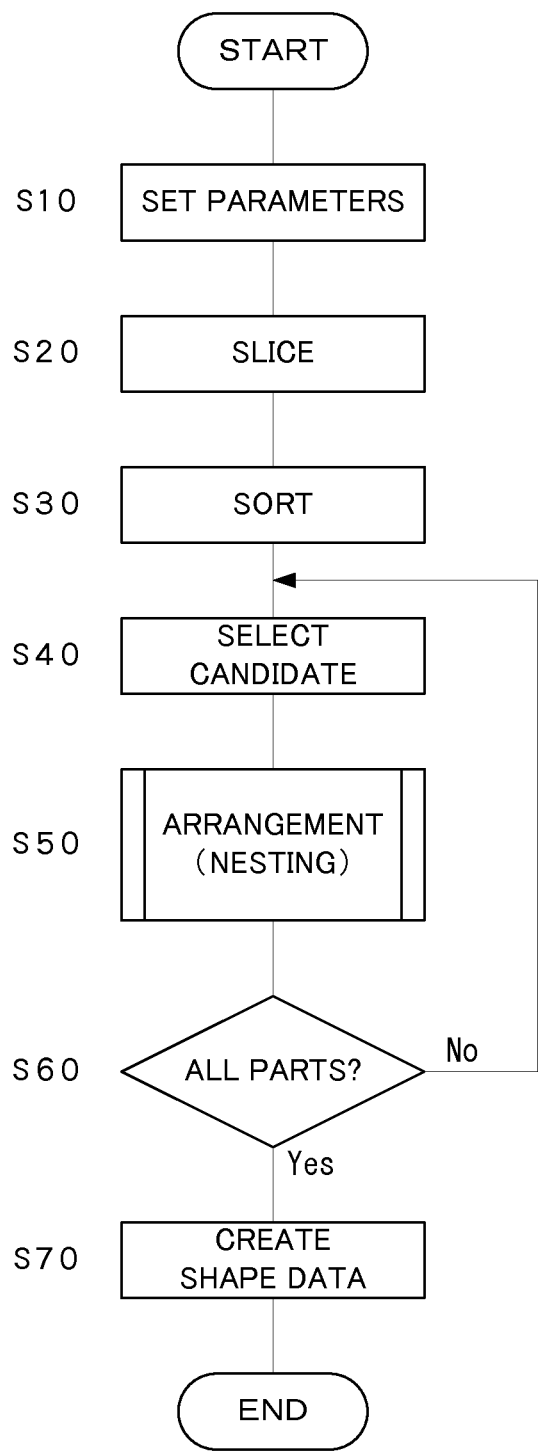
FIG. 3 is a flowchart showing overall process procedures by the shape data generation apparatus according to the embodiment.

FIG. 3 is a flowchart showing the overall process procedures of the shape data generation apparatus 1 according to the embodiment.

First, the user of the shape data generation apparatus 1 can set or change the values of various parameters via the setting unit 14 (S10). The parameters set here are as follows:

(a) the unit angle of rotation at which a part is rotated, or the number (N: N is a natural number) of rotating operations of a part;

(b) the threshold Ath that is used to determine whether to perform fragmentation; and (c) the minimum space between parts to be nested.

After setting various parameters, the slicing unit 11 slices a cutting shape represented by supplied shape data into a plurality of parts in accordance with a tile (S20). The plurality of parts are ordered (sorted) in descending order of their areas (S30).

The nesting unit 12 selects, as a nesting candidate, a part having a largest area from parts other than a part positioned inside the tile, that is, parts protruding from the tile when the cutting shape is sliced under the control of the control unit 15 (S40). Then, the nesting unit 12 executes the nesting process including the test process by the test unit 121, and fragmentation by the fragmentation unit 122 (S50). Note that details of the nesting process including fragmentation will be described later.

If another part for which the nesting process has not been tried exists upon completion of the nesting process (S50) for one part, this part is selected as a nesting candidate (S40), and the nesting process (S50) is executed. If the nesting process has been executed for all parts ("Yes" in S60), the generation unit 13 generates shape data in which the plurality of parts are nested in the tile (S70). The series of processes then ends.

[Nesting Process and Test Process]

Next, the nesting process, and the test process included in the nesting process will be explained in detail with reference to FIGS. 4 and 5.

Figure 4:
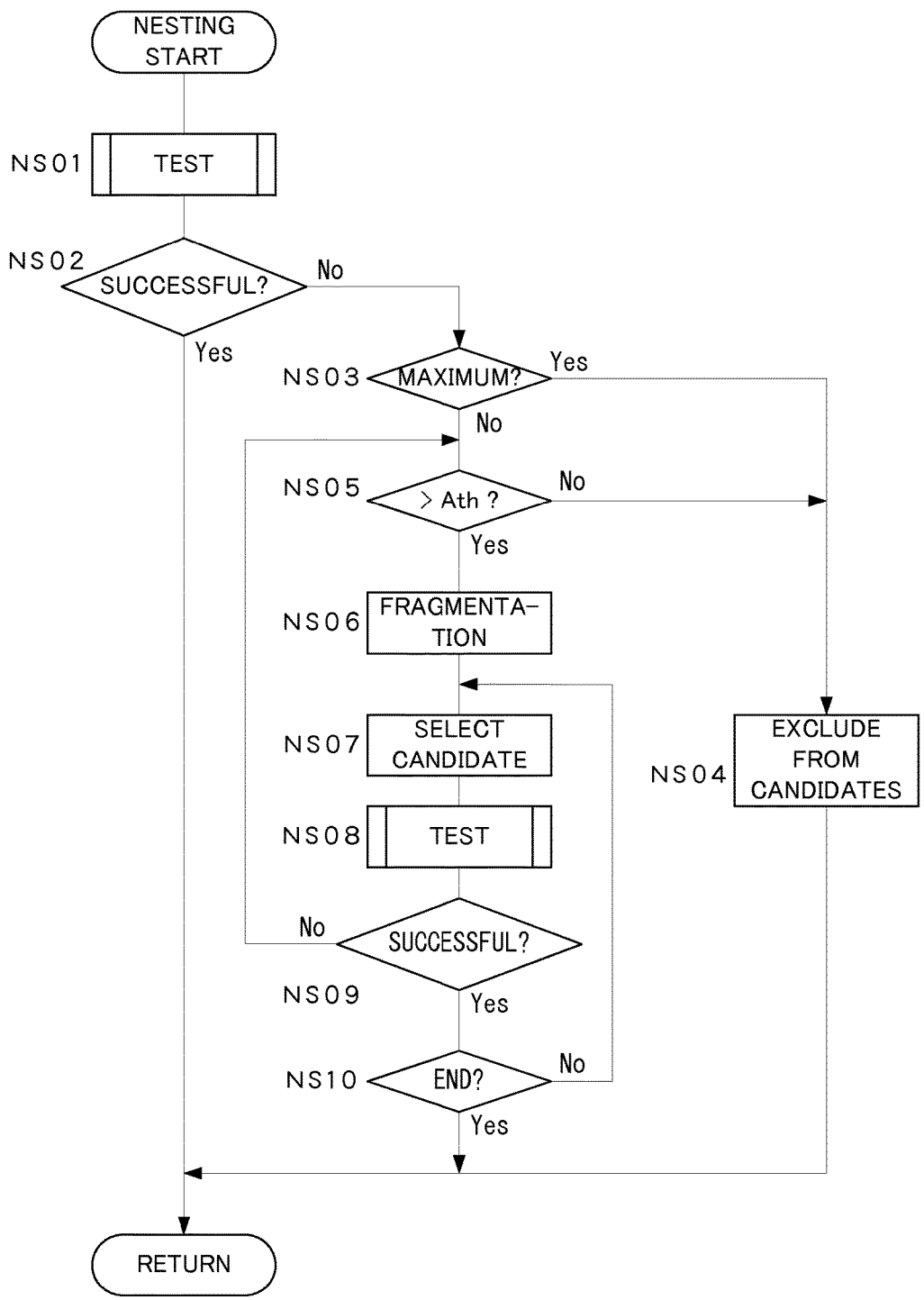
FIG. 4 is a flowchart for explaining the procedures of a nesting process by the shape data generation apparatus according to the embodiment.

First, if a part serving as a nesting candidate is determined in accordance with the size of the part (S40 of FIG. 3), the test process by the test unit 121 is executed to determine whether the part can be nested in the free space of the tile (NS01 of FIG. 4).

Figure 5:
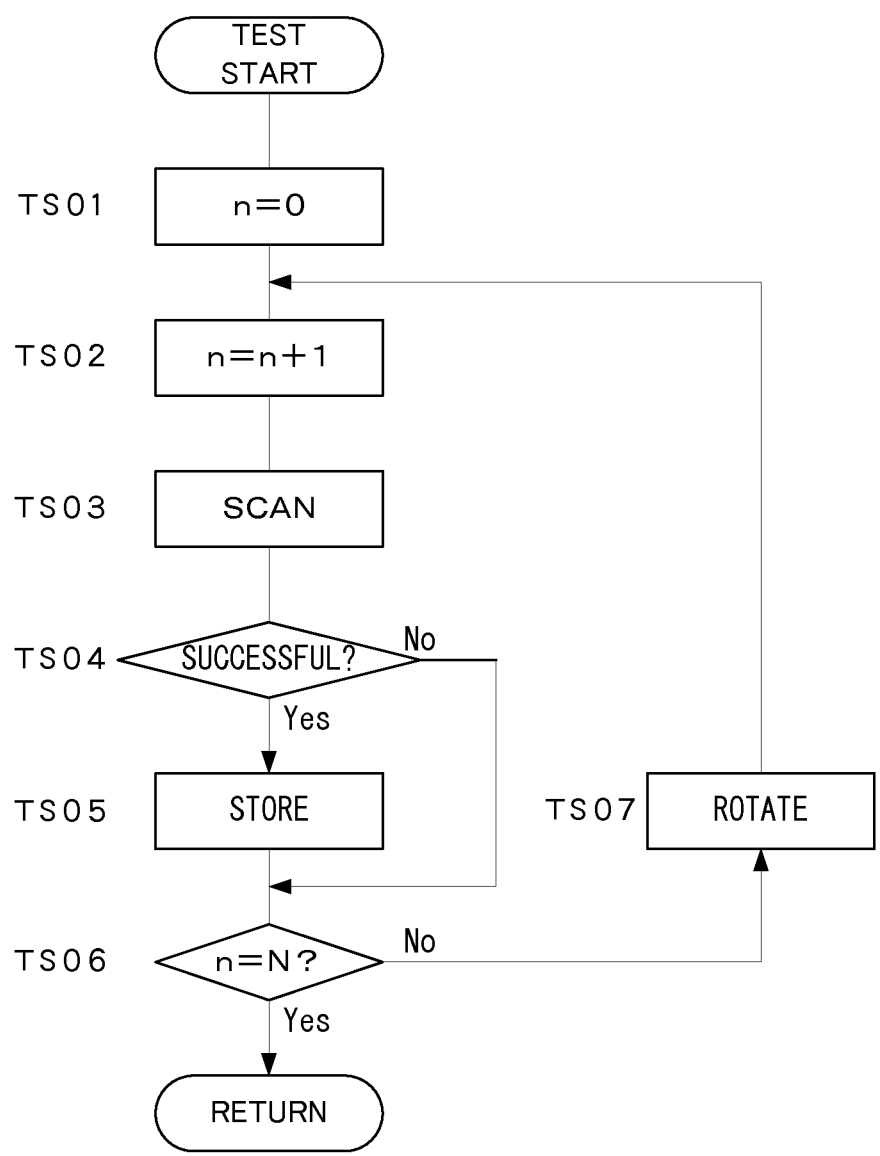
FIG. 5 is a flowchart for explaining the procedures of a test process by the shape data generation apparatus according to the embodiment.

FIG. 5 shows the procedures of the test process by the test unit 121.

First, the number n of rotating operations of a part is reset to n=0 (TS01). Then, the value of the number n of rotating operations is incremented (TS02). Run length encoding of the part and the tile are executed to determine whether nesting is possible (TS03) by comparing their run length-encoded data while scanning the tile over the part. If the part can be nested ("Yes" in TS04), the storage unit 16 stores the position of the part within the tile and the angle of rotation, and data regarding the free space within the tile is updated (TS05). If there is an available angle of rotation not used for the scanning operation ("No" in TS06), the part is rotated by a preset unit angle of rotation (TS07), and run length encoding and the scanning operations are executed again (TS02 and TS03). If the scanning operation has been performed at all available angles of rotation ("Yes" in TS06), the process advances to a process in NS02 of FIG. 4.

If the part can be nested within the tile ("Yes" in NS02) as a result of the above-described test process (NS01 of FIG. 4), the next part serving as a candidate is selected (S40 of FIG. 3), and the nesting process is executed (S50 of FIG. 3).

If the part cannot be nested within the tile ("No" in NS02 of FIG. 4) as a result of the above-described test process (NS01 of FIG. 4), the process of fragmenting the part is executed (NS05 and NS06 of FIG. 4).

In the shape data generation apparatus 1 according to the embodiment, when a plurality of parts protrude from a tile, fragmentation of a part having a largest area among these parts is exceptionally inhibited from the viewpoint of a more efficient nesting process. Hence, when a largest part among parts protruding from a tile cannot be nested even at any available angle of rotation ("No" in NS02 and "Yes" in NS03 of FIG. 4), the part is excluded from nesting candidates without fragmenting the part (NS04 of FIG. 4). The part excluded from candidates serves as a cutting shape for cutting another (second) sheet-like medium by, e.g., the cutting plotter.

If the nesting process target part is not a part having a largest area ("No" in NS03 of FIG. 4), and the area of the part is larger than the threshold Ath that was preset for fragmentation ("Yes" in NS05 of FIG. 4), the part is further fragmented into a plurality of fragments having almost the same area, and the respective fragments are set as new parts (NS06 of FIG. 4).

A nesting process target candidate is selected from the new parts after fragmentation (NS07 of FIG. 4), and the above-described test process is executed for the selected part (NS08 of FIG. 4). If nesting is successful ("Yes" in NS09 of FIG. 4), the process returns to NS07 to select another part as a candidate and execute the test process (NS08 of FIG. 4).

If nesting is not successful ("No" in NS09 of FIG. 4) as a result of the test process (NS08 of FIG. 4), fragmentation (NS06 of FIG. 4) and the test process (NS08 of FIG. 4) are repeated unless the area becomes smaller than the threshold Ath ("Yes" in NS05 of FIG. 4). As for a part whose area becomes smaller than the threshold Ath, not only the part itself, but also a part before fragmentation serving as the parent of the part are excluded from nesting candidates (NS04 of FIG. 4).

Next, examples will be explained with reference to the accompanying drawings.

[Case 1]

As shown in FIG. 6A, a cutting shape is sliced by a rectangular tile into a part A inside the tile, and parts B and C outside the tile as a result of the slice process in the slicing unit 11 (S20 of FIG. 3).

Figure 6B:
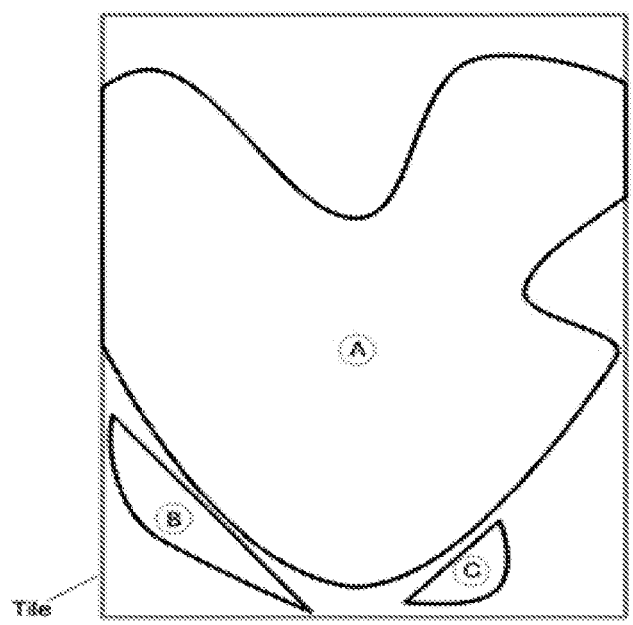
FIG. 6B is a view for explaining the first example of the shape data process by the shape data generation apparatus according to the embodiment.

Then, the larger part B out of the parts B and C outside the tile is selected as a nesting candidate (S40 of FIG. 3), and can be nested in the free space of the tile by the nesting process (S50 of FIG. 3), as shown in FIG. 6B.

Subsequently, the part C is also arranged in the free space of the tile.

Accordingly, the generation unit 13 generates shape data as shown in FIG. 6B as shape data for cutting one sheet-like medium.

In this example, both the parts B and C are only rotated during the test process, and need not be fragmented.

[Case 2]

The above-described case 1 is an example not accompanied by fragmentation of a part. In contrast, case 2 is an example accompanied by fragmentation.

Figure 7A:
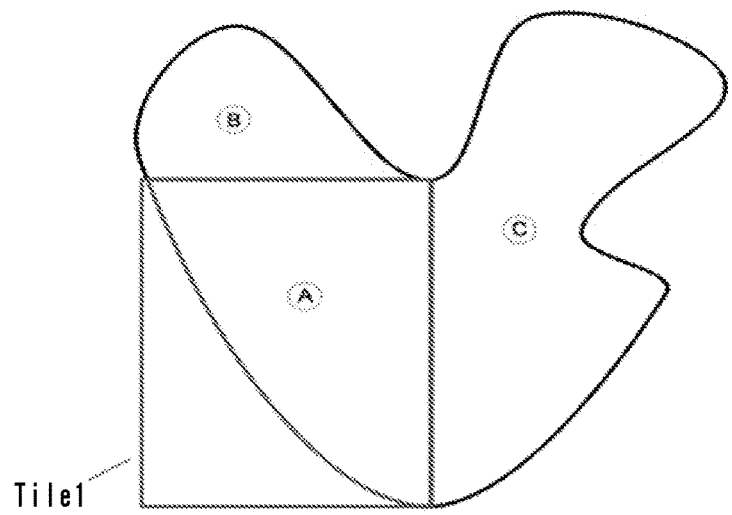
FIG. 7A is a view for explaining the second example of the shape data process by the shape data generation apparatus according to the embodiment.

First, a cutting shape is sliced by a tile 1 into three parts A, B, and C (FIG. 7A).

Of the parts B and C protruding from the tile, the part C having a larger area is first selected as a nesting process target candidate (S30 and S40 of FIG. 3). However, in the nesting process (S50 of FIG. 3), the part C is too large to nest it in the tile 1 together with the part A ("No" in NS02 of FIG. 4) as a result of the test process (NS01 of FIG. 4). Also, the part C is a part having a largest area ("Yes" in NS03 of FIG. 4), is not fragmented, and is excluded from targets to be nested in the tile (NS04 of FIG. 4).

Figure 7B:
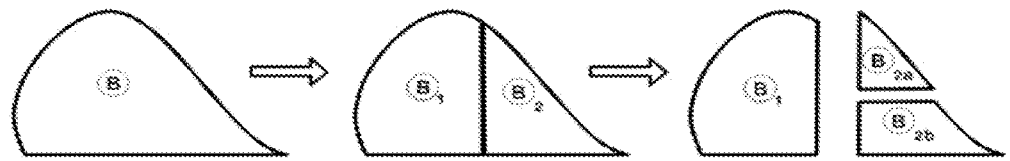
FIG. 7B is a view for explaining the second example of the shape data process by the shape data generation apparatus according to the embodiment.
Figure 7C:
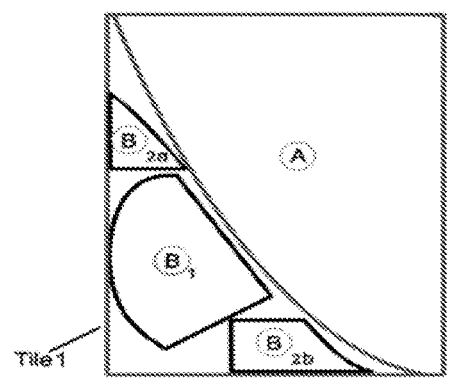
FIG. 7C is a view for explaining the second example of the shape data process by the shape data generation apparatus according to the embodiment.

Thereafter, the second largest part B is selected as a nesting process target candidate (S40 of FIG. 3). In the nesting process (S50 of FIG. 3), the part B cannot be nested without changing its shape ("No" in NS02 of FIG. 4) as a result of the test process (NS01 of FIG. 4). Hence, the fragmentation unit 122 first fragments the part B into two parts B1 and B2 (NS06 of FIG. 4, and FIG. 7B). The result of the test process (NS08 of FIG. 4) reveals that, of the parts B1 and B2, the part B1 can be nested in the tile 1 ("Yes" in NS09 of FIG. 4, FIG. 7C).

The result of the test process (NS01 of FIG. 4) reveals that the part B2 cannot be nested in the tile 1 already including the parts A and B1 ("No" in NS02 of FIG. 4). Thus, the part B2 is fragmented again into parts B2a and B2b (NS06 of FIG. 4, FIG. 7B). As a result of the test process (NS08 of FIG. 4), the two new parts B2a and B2b can be nested in the tile 1, respectively ("Yes" in NS09 of FIG. 4, FIG. 7C).

Figure 7D:
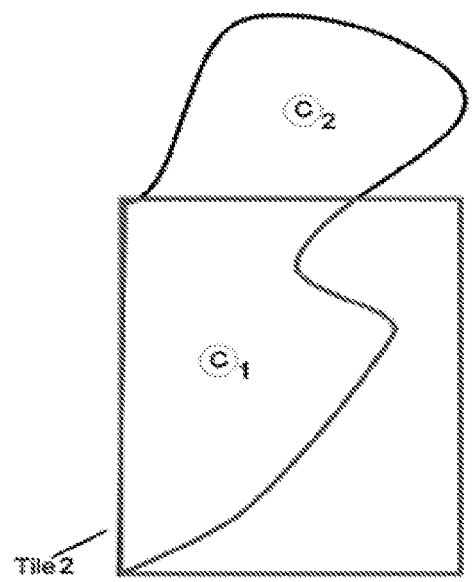
FIG. 7D is a view for explaining the second example of the shape data process by the shape data generation apparatus according to the embodiment.

The part C excluded from targets to be nested in the tile 1 is sliced into parts C1 and C2 by a new tile 2 which is prepared to fit the parts in the second sheet-like medium (S20 of FIG. 3, FIG. 7D).

Figure 7E:
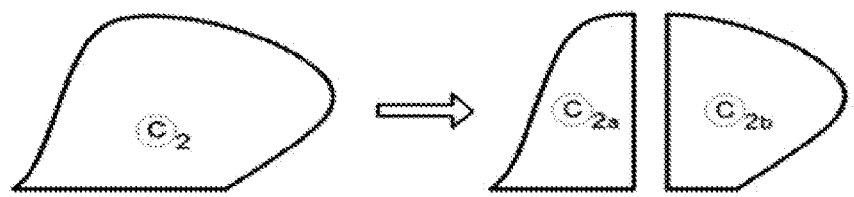
FIG. 7E is a view for explaining the second example of the shape data process by the shape data generation apparatus according to the embodiment.
Figure 7F:
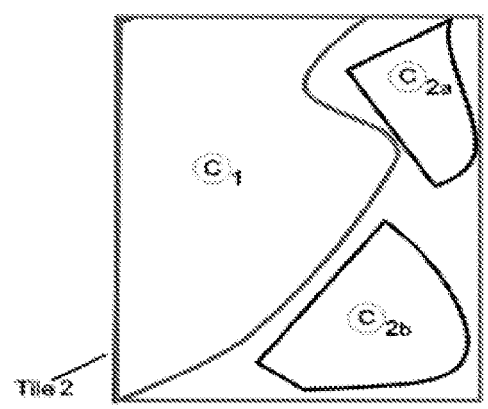
FIG. 7F is a view for explaining the second example of the shape data process by the shape data generation apparatus according to the embodiment.

Then, the nesting process is executed for the part C2 protruding from the tile 2 (S50 of FIG. 3), but the part C2 cannot be nested in the free space of the tile 2 without any change. At this time, only the part C2 protrudes from the tile 2. Further, the area of the part C2 is larger than the threshold Ath ("Yes" in NS05 of FIG. 4). Thus, the fragmentation unit 122 fragments the part C2 into parts C2a and C2b, as shown in FIG. 7E (NS06 of FIG. 4). As a result of executing the test process (NS08 of FIG. 4) for the respective parts C2a and C2b, both the parts C2a and C2b can be nested in the tile 2 together with the part C1.

3. Effects of Embodiment

As described above, when a cutting shape represented by supplied shape data cannot completely fit in a tile representing the shape and size of one sheet-like medium, the shape data generation apparatus 1 according to the embodiment slices the cutting shape into a plurality of parts in accordance with the tile, and nests parts protruding from the tile in the free space of the tile, thereby generating new shape data. Hence, parts obtained by slicing one cutting shape can be fitted in the free space of a sheet-like medium.

When a given part cannot be nested in the free space of a tile, the nesting unit 12 of the shape data generation apparatus 1 according to the embodiment fragments the part into a plurality of fragments by the fragmentation unit 122, and arranges the fragments of the part as new parts to fit them in the free space of the tile. A sheet-like medium can be used more effectively.

As for the fragmentation, only when the area of a part is larger than the threshold Ath, the part is fragmented, and more effective nesting becomes possible.

The shape data generation apparatus 1 according to the embodiment includes the control unit 15. When a cutting shape has a plurality of parts protruding from a tile, the nesting process is executed in an order complying with the areas of the respective parts, and more effective nesting can be implemented.

The shape data generation apparatus 1 according to the embodiment includes the setting unit which makes it possible to externally set the unit angle of rotation at which a part is rotated in the free space of a tile in the test process. By changing the unit angle of rotation at which a part is rotated, the nesting process can be executed more efficiently.

The present invention is usable in the field of a cutting plotter for cutting a sheet-like medium.

What is claimed is:

1. A shape data generation apparatus comprising:
   a computer having a processor, a storage device, an input device, a display device and a computer program installed in the computer;
   a slicing unit configured to display on the display device and superpose a cutting shape represented by supplied shape data and a closed shape prepared in advance in accordance with an input operation via the input device, slice the cutting shape into a plurality of parts in accordance with the closed shape if the cutting shape cannot be fitted inside the closed shape and protrudes from the closed shape, and store in the storage device shapes and sizes of respective parts, including a part positioned inside the closed shape and a part protruding from the closed shape, obtained by slicing a cutting shape and a position of the part inside the closed shape;
   an arrangement unit configured to search for a free space within the closed shape, the free space being a part of the closed shape other than the part positioned inside the closed shape, based upon the shapes and sizes of the respective parts and the position of the part inside the closed shape stored in the storage device, and arrange, of the cutting shape, the part protruding from the closed shape to fit in the free space within the closed shape; and
   a generation unit configured to generate shape data representing a plurality of parts fitted in the closed shape
   wherein the arrangement unit comprises:
      a test unit configured to search for the free space within the closed shape based upon the shapes, sizes and positions of the respective parts stored in the storage device, and determine whether the part protruding from the closed shape can be arranged in the free space within the closed shape; and
      a fragmentation unit configured to fragment the part into a plurality of fragments when the part protruding from the closed space cannot be arranged in the free space within the closed shape, and wherein the arrangement unit arranges the fragments of the fragmented part as new parts to fit the fragments in the free space.

2. The apparatus according to claim 1, wherein only when an area of the part is larger than a preset threshold, the arrangement unit fragments the part by the fragmentation unit, and arranges the fragments of the fragmented part as new parts to fit the fragments in the free space.

3. The apparatus according to claim 1, further comprising a control unit configured to, when the cutting shape includes a plurality of parts protruding from the closed shape, control the arrangement unit to arrange the parts in an order complying with areas of the parts to fit in the free space within the closed shape.

4. The apparatus according to claim 1, further comprising a setting unit configured to externally set a unit angle of rotation at which the part is rotated in the free space, wherein the test unit determines whether or not the part fits in the free space while rotating the part at a predetermined unit angle of rotation set in the setting unit.

5. A non-transitory computer readable medium storing a shape data generation program for causing a computer comprising a processor, a storage device, an input device and a display device to operate as a shape data generation apparatus, the shape data generation apparatus comprising:
   a slicing unit configured to display on the display device and superpose a cutting shape represented by supplied shape data and a closed shape prepared in advance in accordance with an input operation via the input device, slice the cutting shape into a plurality of parts in accordance with the closed shape if the cutting shape cannot be fitted inside the closed shape and protrudes from the closed shape, and store in the storage device shapes and sizes of respective parts, including a part positioned inside the closed shape and a part protruding from the closed shape, obtained by slicing a cutting shape and a position of the part inside the closed shape;
   an arrangement unit configured to search for a free space within the closed shape, the free space being a part of the closed shape other than the part positioned inside the closed shape, based upon the shapes and sizes of the respective parts and the position of the part inside the closed shape stored in the storage device, and arrange, of the cutting shape, the part protruding from the closed shape to fit in the free space within the closed shape; and
   a generation unit configured to generate shape data representing a plurality of parts fitted in the closed shape;
   wherein the arrangement unit comprises:
      a test unit configured to search for the free space within the closed shape based upon the shapes, sizes and positions of the respective parts stored in the storage device, and determine whether the part protruding from the closed shape can be arranged in the free space within the closed shape; and
      a fragmentation unit configured to fragment the part into a plurality of fragments when the part protruding from the closed shape cannot be arranged in the free space within the closed shape, and wherein the arrangement unit arranges the fragments of the fragmented part as new parts to fit the fragments in the free space.

6. The computer readable medium according to claim 5, wherein only when an area of the part is larger than a preset threshold, the arrangement unit fragments the part by the fragmentation unit, and arranges the fragments of the fragmented part as new parts to fit the fragments in the free space.

7. The computer readable medium according to claim 5, the shape data generation apparatus further comprising a control unit configured to, when the cutting shape includes a plurality of parts protruding from the closed shape, control the arrangement unit to arrange the parts in an order complying with areas of the parts to fit in the free space within the closed shape.

8. The computer readable medium according to claim 5, the shape data generation apparatus further comprising a setting unit configured to externally set a unit angle of rotation at which the part is rotated in the free space, wherein the test unit determines whether or not the part fits in the free space while rotating the part at a predetermined unit angle of rotation set in the setting unit.

* * * * *